H. Sanders,
Horse Collar,
Nº 101,515. Patented Apr 5, 1870.
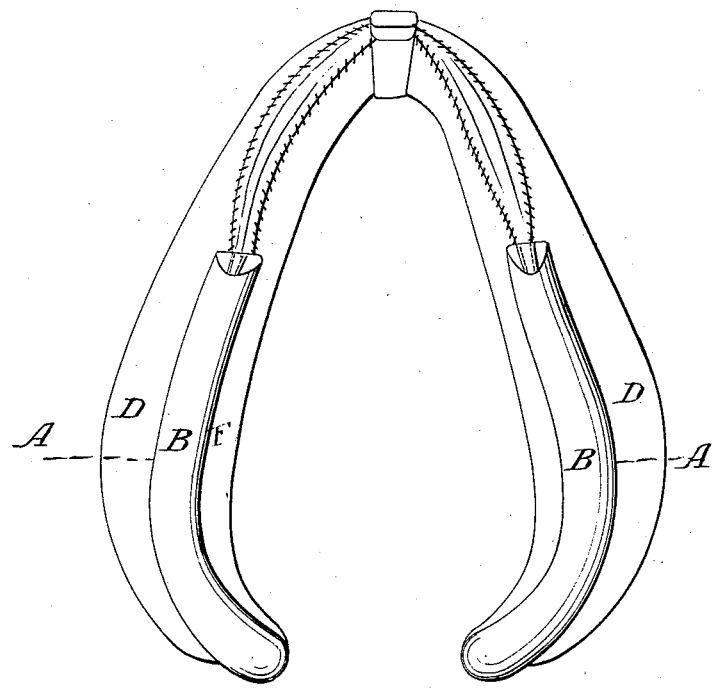
Witnesses.
James Harris
Bradford C. Divine
Inventor
Henry Sanders

United States Patent Office.

HENRY SANDERS, OF UTICA, NEW YORK.

Letters Patent No. 101,515, dated April 5, 1870.

IMPROVED HORSE-COLLAR.

The Schedule referred to in these Letters Patent and making part of the same.

*To all whom it may concern:*

Be it known that I, HENRY SANDERS, of Utica, county of Oneida and State of New York, have invented a new and useful Improvement in the Manner of Making Horse-Collars, of which the following is a full and true description.

The collar now in universal use is made with the rim extending around the whole of it, so that, when the horse travels, it rolls on his shoulders as he moves his fore-legs, creating a constant friction, thereby creating a gall, and for a thick-necked horse it has to be made especially for it to make it fit. It will also choke a horse if it is in the least too small, by the rim coming in contact with his throat.

My object is to construct a collar in such a manner—

First, that it will not gall.

Second, that it will fit horses of any sized and shaped neck.

Third, that it will not choke a horse.

Fourth, that it can be made at one-fourth less expense than the ordinary collar.

I will now describe the manner of constructing my collars, reference being had to the accompanying engraving.

D D are the shoulder-pieces.

F F are the bellies.

B B are the rims.

A A are the lines of draft, and the dotted lines above the rims are the gores.

It consists in making a collar in two separate parts, but strapped or sewed together at the top, dispensing entirely with rim, belly, and shoulder from about five or six inches below line of draft A A; also dispensing with rim from within about eight inches from top of collar, and inserting a gore (as seen by dotted lines) from the end of rim to top of collar, thereby making the top part of the collar self-adjusting, to fit the neck of a horse, be it either thick or thin; also that the collar being entirely separate at the bottom, lies perfectly still on the shoulder of the horse as he travels, consequently it cannot gall, as the rolling motion is prevented.

What I claim as my invention, and desire to secure by Letters Patent, is—

As a new article of manufacture, a horse-collar, with the rim extending only about two-thirds up from the bottom, substantially for the purposes shown and described.

HENRY SANDERS.

Witnesses:
 JNO. BUSWELL,
 JOHN H. SHAFER.